Patented July 14, 1953

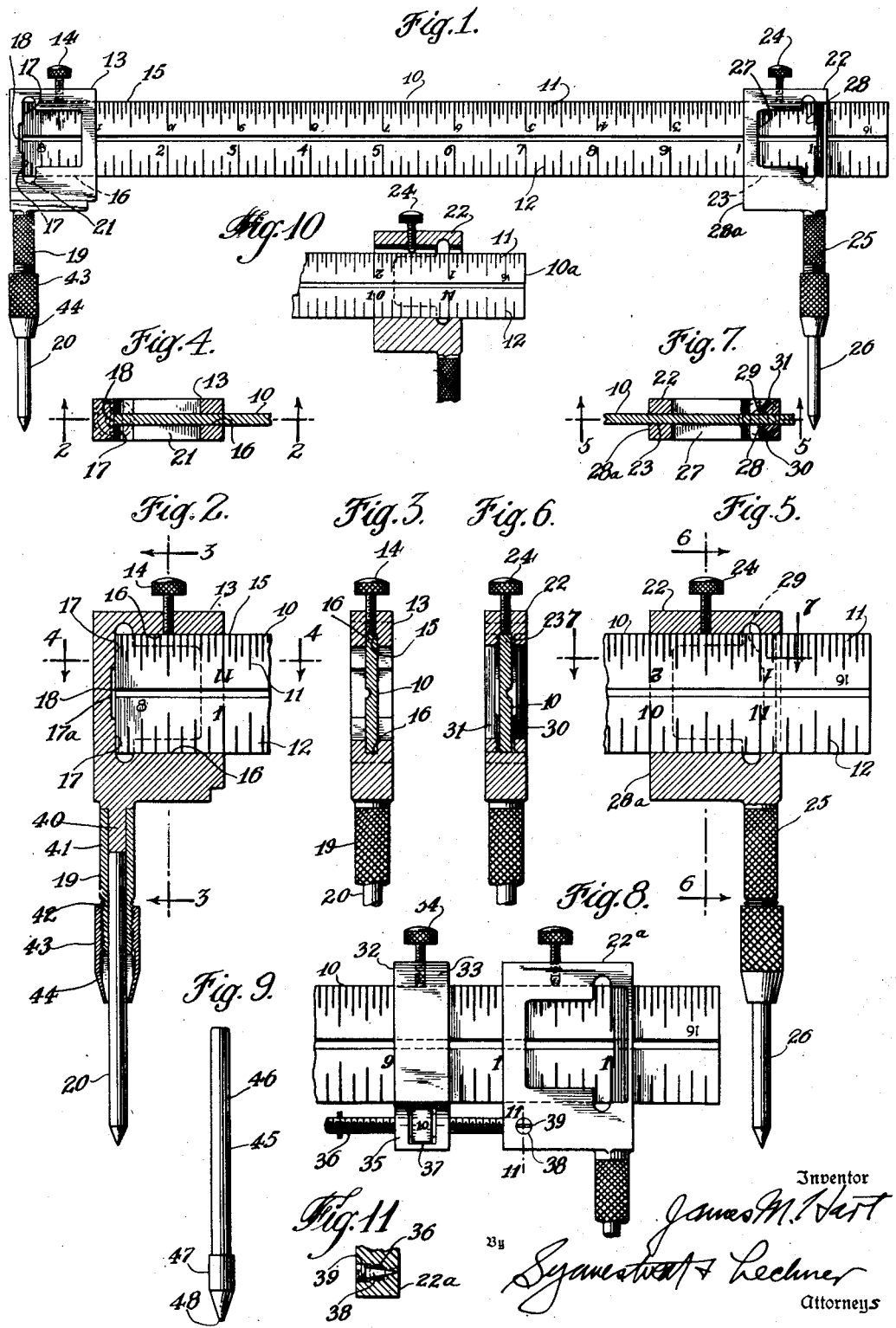

2,645,022

UNITED STATES PATENT OFFICE 2,645,022

TRAMMEL AND BEAM INSTRUMENT

James M. Hart, Philadelphia, Pa.

Application August 3, 1948, Serial No. 42,185

3 Claims. (Cl. 33—159)

My invention relates to trammel-and-beam instruments and is especially concerned with beam compasses of the type including a compass beam and one or more removable trammels.

More specifically, the invention goes to the configuration of the trammel heads of a beam compass, the invention contemplating two dissimilar heads respectively adapted to support a zero or center point and a marking point.

A general object of the invention is to provide a single pair of trammel heads, which, when combined with a compass beam, will meet the requirements of a large number of different measuring and gauging operations.

A further object of the invention is a beam compass in which the distance between the compass points may be read off directly on a scale without correcting for displacement between a reading line and a point.

A further object of the invention is to provide a beam compass with which distances may be read off from a plurality of scales without changing the adjustment of the device. More specifically, the invention has as an object a beam compass with which distances may be read off alternatively against one of a plurality of scales without necessarily rearranging one or both of the trammel heads relative to the beam.

Yet another object of the invention is to permit distances to be measured off to the full length of a scale inscribed on a compass beam.

Another object of the invention is to provide a zero or center trammel which may be removed from a compass beam in a simple manner and yet which, when mounted on a compass beam, will support a trammel point in precise alignment with the beginning of a scale or scales inscribed on the beam.

Still further, the invention contemplates a trammel head of unusually rugged and simple construction, which at the same time permits the reading of a plurality of scales against a reading edge aligned with the movable trammel point; and further, such a head adapted to cooperate with one or more scales on each of two faces of a beam.

Still further, the invention contemplates a novel marking device which may be substituted for the conventional trammel point in either or both of the trammels.

Beyond the foregoing, the invention contemplates a movable trammel head having one or more of the characteristics hereinabove mentioned and additionally adapted to cooperate with a micrometer adjusting device to provide for minute adjustment of the trammel along the compass beam.

The invention further contemplates a trammel head invertible on a scale beam, and in one or both positions adapted to cooperate with another head for gauging, measuring or marking.

How the foregoing and other objects are attained will appear more fully in the description contained hereinbelow, and in the drawings, in which:

Figure 1 is an elevational view of a pair of my novel trammels in operative assembly with a calibrated compass beam;

Figure 2 is a vertical sectional view of the left-hand trammel head disclosed in Figure 1, on a larger scale, taken along the line indicated at 2—2 in Figure 4, only one end portion of the beam being shown;

Figure 3 is a transverse sectional view of the trammel head and beam of Figure 2 taken along the line 3—3 of Figure 2;

Figure 4 is a horizontal sectional view of the trammel head and beam of Figure 2 taken along the line 4—4 in Figure 2;

Figure 5 is a vertical sectional view of the right-hand trammel head of Figure 1 taken along the line 5—5 in Figure 7, and showing the right-hand end portion of the beam;

Figure 6 is a transverse sectional view of the right-hand or movable trammel head, on the beam, taken along the line 6—6 in Figure 5;

Figure 7 is a horizontal sectional view of the right-hand trammel head, and fragment of the beam, taken along the line 7—7 in Figure 5;

Figure 8 is an elevational view of a movable trammel head similar to the right-hand head in Figure 1, mounted upon a compass beam in cooperative relationship with a micrometer adjustment device;

Figure 9 is an elevation of a ball point pen adapted to be supported by the trammel heads of Figures 1 through 8;

Figure 10 is a fragmentary sectional view, similar to Figure 5, illustrating the adaptability of my trammels to beams of different sizes; and Figure 11 is a sectional view of a portion of Figure 8 taken along the line 11—11 of Figure 8.

In Figure 1 I have illustrated a compass beam generally indicated at 10, carrying four scales, two on either side, one of which is illustrated at 11 and another of which is illustrated at 12. A zero or center trammel head 13 is removably secured to the beam by means of a set screw 14 arranged to engage the top edge 15 of the beam 10. Head 13 is provided with a socket 16 which, as may be seen in Figure 3, is adapted to telescopically engage the beam 10. The bottom of the socket comprises the plane surfaces 17 (Figures 1, 2 and 4), separated by the undercut portion 17a, which are adapted to engage the end surface 18 of beam 10. Trammel head 13 carries a support generally indicated at 19 for a trammel point 20, the support being arranged to maintain the axis of point 20 in alignment with the surfaces 17. Hence, when the head is mounted on the beam with surfaces 17 in alignment with the end surfaces 18 of the beam, it will at once be apparent that by employing a beam calibrated from the end surfaces 18 as zero, distances may be measured along the scale from the point 20 without correcting for displacement between the point and the beginning of the scale.

Head 13 is also penetrated by a generally T-shaped aperture 21, extending normal to and intersecting socket 16. Aperture 21 extends completely through head 13 as may best be seen in Figure 4, and thus exposes a portion of both sides of the beam 10.

The aperture 21 provides for inspection of the engagement of beam 10 with surfaces 17, and also permits the surfaces 17 to be cleaned so that the accuracy of engagement between the end of the beam and the surfaces 17 may be maintained.

Turning now to the opposite end of the beam as disclosed in Figure 1, attention is directed to movable trammel head 22, which is completely penetrated by an aperture 23 (see Figure 7) adapted to slidingly engage beam 10. Head 22 is adapted to be locked to beam 10 in any position of adjustment by set screw 24, and carries a point support 25 and point 26 similar to the support 19 and point 20 respectively. Head 22 is also provided with a transverse aperture 27 similar in outline to the aperture 21 but defined in part by the reading lines 28 and 29, which are formed by the intersection of the bevelled surfaces 30 and 31 with adjacent surfaces of aperture 23. It will be seen, therefore, that a reading line is provided for each of the two scales on each side of beam 10. It will further be noted that the axis of point 26 is aligned with reading lines 28 and 29, and, accordingly, that the distance between points 20 and 26 may be read directly from any of the scales on beam 10 without correcting for displacement between the point 26 and the reading line 28 or between the point 20 and the zero point on the scale, as has been set forth above.

It will further be noted that the set screw 24 of head 22 is disposed in a plane transverse beam 10 removed from the transverse plane containing the axis of point 26 by a distance equal to about half the length of head 22, thus permitting the reading line 28 to be advanced to the very end of a scale on beam 10; and, accordingly, providing for the measurement of distances equal to the full length of the beam 10.

The position of head 22 on beam 10 is adapted to be reversed for the measurement of short distances, thus permitting the point 26 to be brought closer to point 20. It should also be understood that the scales may be read against the edge 28a, in which case a correction of exactly 1″ must be made, since the distance between the edge 28a and the reading line 28 is exactly 1″.

In Figure 8 I have illustrated the combination of a movable trammel head 22a similar to head 22, with a micrometer adjusting device generally indicated at 32. Micrometer device 32 includes a head member 33 adapted to slidingly engage beam 10 and to be secured thereto by a set screw 34, a support 35 for a screw 36, and a nut 37 in engagement with the screw. The end of screw 36 is adapted to be removably secured to head 22a by means of a screw-headed tapered pin 38 let into a hole 39 in head 22 and adapted to engage the end of screw 36, as is disclosed in the detailed view of Figure 11. Advantageously and preferably, the micrometer device is proportioned to provide for an advance of head 22a of one inch by thousandths of an inch.

It is contemplated that a pair of my novel trammel heads may be used with any one of several compass beams. Beams intended for different purposes and beams of the same type but manufactured by different manufacturers may vary in width. Accordingly, the trammel heads may be used with any beam whose width is less than that of the socket 16 of head 13 and aperture 23 of head 22. Figures 1 through 9 illustrate a pair of trammel heads mounted on a beam 10 of width equal to the width of the trammel head apertures. In Figure 10 I have illustrated the application of a movable trammel head 22 to a narrower compass beam 10a. As may be seen upon inspection of Figure 10, head 22 may be accurately locked in position on beam 10a by tightening screw 24 in the same manner as when working with beam 10. It will be understood, of course, that head 13 is similarly adapted to be used with beams of varying width.

Reverting to Figure 2, it will be seen that point support 19 comprises a shouldered pin 40 formed integrally with head 13, a sleeve 41 mounted on pin 40 and threaded as at 42 to cooperate with a tapered collar 43 and jaws 44 for removably mounting a trammel point such as 20. Support 25 of head 22 is similarly constructed.

In addition to the trammel points 20, my trammel heads may be used with other marking devices, as, for example, a pen generally indicated at 45 in Figure 9. Pen 45 comprises shank 46 adapted to be received by the point support 19, and a writing head 47 including a ball point 48. Such a pen is particularly adapted for marking comparatively rough surfaces such as lumber and the like.

It should be observed that the point support 25 is arranged to provide for the substitution of a pen 45 for point 26, without altering the position of either of the heads on the beam, and, accordingly, a distance may be measured between points 20 and 26, and the distance so measured be marked on the work by substituting pen 45 for point 26 after the measuring operation is completed.

It will now be apparent how the intended advantages of the invention are secured. In partial summary: the trammel heads may be used with beams carrying different scales and even with beams of varying dimensions; distances may be read off on any one of several scales without correcting for displacement between the trammel point and the reading line; and the trammel heads are adapted to cooperate interchangeably with certain accessories, as, for example, the ball point marking pen and the micrometer adjustment device above described. Furthermore, gauging operations may be carried on between the edge face 28a of head 22 and the corresponding face of head 13; the scale being read directly between said edges, or between the normal reading edges, in which latter case the gauge distance is readily seen to be the overall scale reading less two inches.

Thus, according to the invention, a trammel-and-beam instrument of great utility, adaptability, ease of use, simplicity and accuracy, is provided.

I claim:
1. For use with a graduated compass beam, a trammel comprising a head and a support for a point extending therefrom, the head being pierced by a first aperture normal to the axis of the support in a manner to slidingly engage a beam and by a second aperture disposed normal to the first and extending entirely through said head to expose portions of two surfaces of the beam, said second aperture being defined in part by reading edges lying in a plane transverse the beam and including the axis of the support, said edges being positioned to register with graduations on the exposed portion of the beam.

2. The trammel of claim 1 wherein said head further has an abutment surface for the end of the beam, said surface being in the plane containing said reading edges.

3. The trammel of claim 1 wherein the said first aperture is adapted to fit the cooperating beam with the trammel in either of two positions of relative inversion, and wherein the reading edges which in part define the second aperture are configured for cooperation with graduations on both side faces of the beam, with the trammel in either of said positions.

JAMES M. HART.

References Cited in the file of this patent

UNITED STATES PATENTS

| Number | Name | Date |
|---|---|---|
| 431,702 | Sittley | July 8, 1890 |
| 691,827 | Tucker | Jan. 28, 1902 |
| 790,286 | Buxton | May 23, 1905 |
| 1,035,033 | Nelson | Aug. 6, 1912 |
| 1,266,845 | Morin | May 21, 1918 |
| 1,321,312 | Jooss | Nov. 11, 1919 |
| 1,472,181 | Louden | Oct. 30, 1923 |
| 1,511,255 | Barker | Oct. 14, 1924 |
| 1,619,750 | Nelson | Mar. 1, 1927 |
| 2,087,600 | Knoblauch | July 20, 1937 |
| 2,178,293 | Wogeck | Oct. 31, 1939 |
| 2,309,809 | Vane | Feb. 2, 1943 |
| 2,332,568 | Gauthier | Oct. 26, 1943 |
| 2,499,673 | Olejniczak | Mar. 7, 1950 |
| 2,537,473 | McCusker | Jan. 9, 1951 |
| 2,542,561 | Olejniczak | Feb. 20, 1951 |
| 2,552,324 | Kingsley | May 8, 1951 |

FOREIGN PATENTS

| Number | Country | Date |
|---|---|---|
| 13,694 | Great Britain | July 31, 1900 |
| 290,500 | Germany | Mar. 4, 1916 |

OTHER REFERENCES

American Machinist, page 369, August 29, 1929.